in United States Patent (10) Patent No.: US 9,577,245 B2
Yamami et al. (45) Date of Patent: Feb. 21, 2017

(54) NON-AQUEOUS ELECTROLYTE SECONDARY CELL CONTAINING NEGATIVE ACTIVE MATERIAL INCLUDING SCALY GRAPHITE PARTICLES AND GRAPHITE PARTICLES COATED WITH AMORPHOUS CARBON PARTICLES AND AMORPHOUS CARBON LAYER AND METHOD OF MANUFACTURING THE SAME

(75) Inventors: Shinichi Yamami, Minami-Awaji (JP); Shingo Tode, Kasai (JP); Toyoki Fujihara, Hyogo (JP); Toshiyuki Nohma, Kakogawa (JP)

(73) Assignee: SANYO Electric Co., Ltd., Daito-shi (JP)

( * ) Notice: Subject to any disclaimer, the term of this patent is extended or adjusted under 35 U.S.C. 154(b) by 166 days.

(21) Appl. No.: 14/129,436

(22) PCT Filed: Jun. 25, 2012

(86) PCT No.: PCT/JP2012/066110
§ 371 (c)(1),
(2), (4) Date: Dec. 26, 2013

(87) PCT Pub. No.: WO2013/002162
PCT Pub. Date: Jan. 3, 2013

(65) Prior Publication Data
US 2014/0134492 A1 May 15, 2014

(30) Foreign Application Priority Data
Jun. 30, 2011 (JP) ................................ 2011-146388

(51) Int. Cl.
*H01M 4/133* (2010.01)
*H01M 4/1393* (2010.01)
*H01M 4/583* (2010.01)
*H01M 10/0525* (2010.01)
*H01M 4/587* (2010.01)
*H01M 4/36* (2006.01)
H01M 4/505 (2010.01)
H01M 4/525 (2010.01)

(52) U.S. Cl.
CPC ........... *H01M 4/1393* (2013.01); *H01M 4/133* (2013.01); *H01M 4/366* (2013.01); *H01M 4/587* (2013.01); H01M 4/505 (2013.01); H01M 4/525 (2013.01); H01M 10/0525 (2013.01); Y02E 60/122 (2013.01); Y02P 70/54 (2015.11); Y02T 10/7011 (2013.01)

(58) Field of Classification Search
CPC .... H01M 4/587; H01M 4/1393; H01M 4/366; H01M 4/133

USPC ......... 429/223, 231.8, 231.1, 231.3; 427/113
See application file for complete search history.

(56) References Cited

U.S. PATENT DOCUMENTS

| 5,571,632 | A | * | 11/1996 | Teramoto | ........... H01M 2/0413 29/623.1 |
| 5,601,951 | A | * | 2/1997 | Johnson | ............. H01M 4/0459 429/101 |
| 6,803,150 | B1 | | 10/2004 | Iriyama et al. | |
| 6,998,192 | B1 | * | 2/2006 | Yumoto | ................ H01M 4/133 252/182.1 |
| 2004/0224232 | A1 | * | 11/2004 | Yamaguchi | ............. H01M 4/13 429/232 |
| 2006/0073387 | A1 | | 4/2006 | Sakagoshi et al. | |
| 2009/0004569 | A1 | | 1/2009 | Yamamoto et al. | |
| 2012/0251888 | A1 | | 10/2012 | Yamamoto et al. | |

FOREIGN PATENT DOCUMENTS

| EP | 2 306 560 A1 | 4/2011 |
| JP | 11-111270 A | 4/1999 |
| JP | 3152226 B2 | 4/2001 |
| JP | 2001319651 A * | 11/2001 |
| JP | 2002-175810 A | 6/2002 |
| JP | 2003-242977 A | 8/2003 |
| JP | 2005-44775 A | 2/2005 |
| JP | 2005-294011 A | 10/2005 |
| JP | 2010-218758 A | 9/2010 |
| JP | 2011-216241 A | 10/2011 |
| WO | 2007/086603 A1 | 8/2007 |
| WO | 2010/113783 A1 | 10/2010 |

OTHER PUBLICATIONS

Ozeki et al., Machine translation of JP 2001-319651 A, Nov. 2001.*
Ishii et al., Machine translation of JP 2010-218758 A, Sep. 2010.*
Office Action dated Aug. 5, 2015, issued in counterpart Chinese Patent Application No. 201280031444.0, with English Translation (10 pages).

* cited by examiner

*Primary Examiner* — Sean P Cullen
(74) *Attorney, Agent, or Firm* — Westerman, Hattori, Daniels & Adrian, LLP

(57) ABSTRACT

Disclosed is a non-aqueous electrolyte secondary cell excellent in capacity retention rate and I-V characteristics after repeated cycles. The secondary cell contains a negative electrode active material containing scaly graphite particles and coated graphite particles. The coated graphite particles contain graphite particles and a coating layer coating the surfaces of the graphite particles. The coating layer contains amorphous carbon particles and an amorphous carbon layer. It is preferable that the negative electrode active material contain 1 to 6% by mass of the scaly graphite particles and that the graphite particles, the amorphous carbon particles, and the amorphous carbon layer be in a mass ratio of $100:\alpha:\beta$ where $1 \leq \alpha \leq 10$, $1 \leq \beta \leq 10$, and $\alpha \leq 1.34\beta$.

10 Claims, No Drawings

NON-AQUEOUS ELECTROLYTE SECONDARY CELL CONTAINING NEGATIVE ACTIVE MATERIAL INCLUDING SCALY GRAPHITE PARTICLES AND GRAPHITE PARTICLES COATED WITH AMORPHOUS CARBON PARTICLES AND AMORPHOUS CARBON LAYER AND METHOD OF MANUFACTURING THE SAME

TECHNICAL FIELD

The present invention relates to a non-aqueous electrolyte secondary cell, and more particularly, to an improved negative electrode for use in a non-aqueous electrolyte secondary cell.

BACKGROUND ART

Portable information terminals such as mobile phones and laptop personal computers have been rapidly reduced in size and weight in recent years. In line with this trend, non-aqueous electrolyte secondary cells such as lithium-ion secondary cells have been widely used, because of their high energy density and high capacity, as power sources for driving the portable information terminals. These non-aqueous electrolyte secondary cells are also being increasingly used as power sources for driving such devices as electric vehicles (EVs) and hybrid electric vehicles (HEVs) that require a large amount of current.

The non-aqueous electrolyte secondary cells include a negative electrode made of carbon materials. Of the materials, graphite-based carbon materials such as natural and artificial graphite are more used, because of their larger discharge capacity, than amorphous carbon materials.

The cells used as the power sources for driving EVs and HEVs are required to have high-rate charge-discharge capacity characteristics suitable to perform rapid charge and high load discharge. In a cell including a graphite negative electrode, however, high-rate charge-discharge operations often cause lithium deposition on the surface of the graphite negative electrode. The deposited lithium does not contribute to the subsequent charge-discharge cycles, resulting in a decrease in discharge capacity (remaining capacity) after repeated cycles.

In this situation, Patent Documents 1 to 6 present the use of various negative electrode active materials prepared by mixing different kinds of carbon materials.

CITATION LIST

Patent Documents
Patent Document 1: Japanese Patent No. 3152226
Patent Document 2: Japanese Unexamined Patent Publication No. 2005-44775
Patent Document 3: Japanese Unexamined Patent Publication No. 2003-242977
Patent Document 4: Japanese Unexamined Patent Publication No. 2005-294011
Patent Document 5: Japanese Unexamined Patent Publication No. H11-111270
Patent Document 6: Japanese Unexamined Patent Publication No. 2002-175810

Patent Document 1 discloses a technique of using a negative electrode active material with the following features. The negative electrode active material is made of at least two kinds of carbon materials. One is scaly graphite particles. The other is non-scaly graphite coated with amorphous carbon, having a packing density in the range of 1.3 to 1.8 g/cc, and a specific surface area in the range of 2.1 to 4.1 m$^2$/g. This technique is stated to provide a non-aqueous electrolytic solution secondary cell with high capacity and excellent charge-discharge efficiency.

Patent Document 2 discloses a technique of using a negative electrode active material containing two types of graphite, A and B. The graphite A is either spherical or elliptic and has an average primary particle size in the range of 10 to 30 µm, a crystallite size of less than 100 nm in the c-axis direction, and a tap density of 1.0 g/cm$^3$ or more. The graphite B is flat and has an average primary particle size in the range of 1 to 10 µm, a crystallite size of 100 nm or more in the c-axis direction. This technique is stated to provide a lithium secondary cell with high capacity and excellent cycle characteristics.

Patent Document 3 discloses a technique of using a negative electrode active material containing agglomerated carbon, fibrous carbon, and scaly carbon. This technique is stated to provide a non-aqueous electrolyte cell excellent in high-temperature cycle-life performance in the case it is used for large-current charge and discharge.

Patent Document 4 discloses a technique of using a negative electrode active material containing a mixture of two types of graphite particles, coated and uncoated, with amorphous carbon. This technique is stated to provide a non-aqueous electrolyte secondary cell including a negative electrode that does not have lithium deposition or cause cycle degradation under high-rate charge conditions.

Patent Document 5 discloses a technique of using a negative electrode containing artificial graphite powder and scaly graphite powder. This technique is stated to provide a lithium secondary cell that is excellent both in discharge capacity and cycle capacity retention.

Patent Document 6 discloses a technique of using a negative electrode containing a scaly carbonaceous material and a spherical material with an aspect ratio of 1.1 to 2.9. This technique is stated to improve the coating film strength of a negative electrode active material layer and the adhesion between the layer and the current collector, and to suppress a decrease in cycle characteristics due to exfoliation of the active materials from the current collector.

These techniques of Patent Documents 1 to 6, however, are not enough to provide sufficient high-rate charge-discharge cycle characteristics.

SUMMARY OF THE INVENTION

Technical Problem

Through diligent study, the inventors of the present invention have made the following findings about the cause of a decrease in the cycle characteristics of a non-aqueous electrolyte secondary cell including a graphite negative electrode. The negative electrode changes its volume in response to the absorption and desorption of lithium ions during charge-discharge cycles and is consequently wrinkled. In the wrinkled negative electrode, conductivity is non-uniform, causing heterogeneous charge-discharge reactions, resulting in a decrease in cycle characteristics. The heterogeneous charge-discharge reactions are likely to occur during high-rate charge-discharge cycles or high-temperature charge-discharge cycles, thereby often causing a decrease in high-rate charge-discharge cycle characteristics or high-temperature cycle characteristics.

An object of the present invention is to provide a non-aqueous electrolyte secondary cell with excellent high-rate charge-discharge cycle characteristics, which has been achieved by examining the above findings.

Solution to Problem

To solve the above-mentioned problem, a non-aqueous electrolyte secondary cell of the present invention includes a positive electrode containing a positive electrode active material, a negative electrode containing a negative electrode active material, and a non-aqueous electrolyte. The negative electrode active material includes scaly graphite particles and coated graphite particles. The coated graphite particles contain graphite particles and a coating layer coating the surfaces of the graphite particles. The coating layer contains amorphous carbon particles and an amorphous carbon layer.

In this configuration, the negative electrode active material contains scaly graphite particles and coated graphite particles. The coated graphite particles contain graphite particles and a coating layer coating the surfaces of the graphite particles. The coating layer contains amorphous carbon particles and an amorphous carbon layer. In the coated graphite particles, the surfaces of the graphite particles are coated with the coating layer in which the amorphous carbon particles are present. Although having a smaller capacity than graphite, amorphous carbon has a high performance to accept lithium ions and is therefore unlikely to have lithium deposition on its surface. As a result, the use of the coated graphite particles, which contain graphite particles and amorphous carbon coating the surfaces of the graphite particles, can reduce lithium deposition due to rapid charge while maintaining the capacity of the cell, thereby achieving excellent high-rate charge-discharge cycle characteristics.

Amorphous carbon, however, is less conductive than graphite. Therefore, if the negative electrode active material consists only of the coated graphite particles, the negative electrode is likely to have a high internal resistance, and hence, heterogeneous charge-discharge reactions. In contrast, in the above configuration, the negative electrode contains not only the coated graphite particles but also the scaly graphite particles with no coating layer. This suppresses an increase in the internal resistance of the negative electrode because of the higher electron conductivity of graphite than amorphous carbon. Furthermore, the amorphous carbon particles contained in the coating layer that coats the surfaces of the graphite particles make the coating layer more conductive, thereby further suppressing the increase in the internal resistance of the negative electrode. Thus, the successful suppression of the increase in the internal resistance of the negative electrode allows charge-discharge reactions in the negative electrode to be less heterogeneous. Moreover, the scaly graphite has less volume change due to charge-discharge cycles than the coated graphite. This feature enables the scaly graphite to function as an absorber to absorb the volume change of the coated graphite particles, thereby making the negative electrode containing coated graphite less wrinkled after charge-discharge cycles. These effects act synergistically to improve the capacity retention rate and output-regeneration characteristics after high-rate charge-discharge cycles.

It is difficult to form the coating layer only by bonding the amorphous carbon particles to the surfaces of the graphite particles. Therefore, the coating layer is required to contain not only the amorphous carbon particles but also the amorphous carbon layer that contains, for example, a carbonized product of a binder for binding the amorphous carbon particles to the graphite particles.

The graphite particles may have a spherical or scaly shape. Scaly particles have a large specific surface area, with the advantage of being likely to form an excellent conductive path, whereas spherical ones have a small specific surface area, with the advantage of having high compactability. It is therefore preferable that the graphite particles used with the coated graphite particles be scaly, and that the graphite particles used as the nuclei of the coated graphite particles be spherical.

The term "spherical graphite particles" indicate graphite particles with an aspect ratio (long diameter/short diameter) of 2.0 or less, whereas the term "scaly graphite particles" indicate those with an aspect ratio of 2.5 or more. The aspect ratio can be measured by observing particles with a scanning electron microscope (for example, at 1000-fold magnification).

In the above configuration, the negative electrode active material may contain 1 to 6% by mass of the scaly graphite particles.

As the content of the scaly graphite particles is decreased, the above-mentioned effects of the scaly graphite particles to increase conductivity and to absorb the volume expansion are reduced. On the other hand, as the content of the scaly graphite particles is increased, the scaly graphite particles become more likely to have lithium deposition on their surfaces. To strike a balance between them, it is preferable that the proportion of the scaly graphite particles in the negative electrode active material be 1 to 6% by mass.

In the above configuration, the coated graphite particles may contain the graphite particles, the amorphous carbon particles, and the amorphous carbon layer in a mass ratio of $100:\alpha:\beta$ where $1 \leq \alpha \leq 10$, $1 \leq \beta \leq 10$, and $\alpha \leq 1.34\beta$.

If the amorphous carbon particles and the amorphous carbon layer contained in the coating layer are each larger in mass than 10% of the graphite particles used as the nuclei, this might cause a decrease in discharge capacity of the cell due to the large amount of the amorphous carbon having a small discharge capacity. If, on the other hand, the mass of the amorphous carbon particles is smaller than the above-mentioned range, this might reduce the effect of the amorphous carbon particles to improve conductivity. If the mass of the amorphous carbon layer is smaller than the range, this might cause the amorphous carbon particles to be peeled off from the graphite particles. Hence, it is preferable to set these components to the above-mentioned range.

In the above configuration, the coated graphite particles may have a median diameter of 12 to 16 μm when measured by laser diffraction.

If the median diameter of the coated graphite particles is smaller than the above-mentioned range, this would cause the slurry to have poor coating performance in the preparation of the negative electrode, making the slurry poorly bonded to the core body. If, on the other hand, the median diameter of the coated graphite particles is larger than the range, the active material particles would come into contact with each other at few contact points, making the negative electrode less conductive. Hence, it is preferable to set the median diameter to the above-mentioned range.

In the above configuration, the coated graphite particles may have a tapped bulk density of not less than 0.9 g/cc.

If the tapped bulk density of the coated graphite particles is lower than the above-mentioned condition, this would cause the slurry to have poor coating performance in the preparation of the negative electrode, making the slurry poorly bonded to the core body. Hence, it is preferable to set the tapped bulk density to the above-mentioned condition.

The term "tapped bulk density" is a value calculated from an apparent volume by introducing 50 g of a sample into a graduated cylinder and then being tapped 700 times.

In the above configuration, the coated graphite particles have a specific surface area of 4 to 6 m²/g.

If the specific surface area is smaller than the above-mentioned range, this would cause the coated graphite particles to have poor low-temperature characteristics. If, on the other hand, the specific surface area is larger than the range, this would make the coated graphite particles likely to have a side reaction with the non-aqueous electrolyte during the charge-discharge cycles, possibly degrading the active material. Hence, it is preferable to set the specific surface area to the above-mentioned range.

In the above configuration, the scaly graphite particles may have a median diameter of 5 to 10 μm when measured by laser diffraction.

If the median diameter of the scaly graphite particles is smaller than the above-mentioned range, this would cause the slurry to have poor coating performance in the preparation of the negative electrode, making the slurry poorly bonded to the core body. If, on the other hand, the median diameter of the scaly graphite particles is larger than the range, the conductive path formed by the scaly graphite particles is not dense, making the negative electrode less conductive. Hence, it is preferable to set the median diameter to the above-mentioned range.

In the above configuration, the scaly graphite particles may have a tapped bulk density of not less than 0.05 g/cc.

If the tapped bulk density of the scaly graphite particles is lower than the above-mentioned condition, this would cause the slurry to have poor coating performance in the preparation of the negative electrode, making the slurry poorly bonded to the core body. Hence, it is preferable to set the tapped bulk density to the above-mentioned condition.

In the above configuration, the scaly graphite particles may have a specific surface area of 5 to 15 m²/g.

If the specific surface area of the scaly graphite particles is smaller than the above-mentioned range, this would cause the scaly graphite particles to have poor low-temperature characteristics. If, on the other hand, the specific surface area is larger than the range, this would make the scaly graphite particles likely to have a side reaction with the non-aqueous electrolyte during the charge-discharge cycles, possibly degrading the active material. Hence, it is preferable to set the specific surface area to the above-mentioned range.

The non-aqueous electrolyte secondary cell of the present invention may contain, as a positive electrode active material, a lithium-transition metal composite oxide that can absorb and desorb lithium ions. Specific examples of the lithium-transition metal composite oxide include: lithium cobalt oxide, lithium manganese oxide, lithium nickel oxide, lithium-nickel-manganese composite oxide, lithium-nickel-cobalt composite oxide, lithium-nickel-cobalt-manganese composite oxide, and lithium iron phosphate with an olivine structure.

A preferable example of the positive electrode active material is a nickel-containing lithium-transition metal composite oxide excellent in discharge capacity, which is expressed by $Li_{1+a}(Ni_xCo_yMn_z)_{1-a}O_2$ where $0 \leq a \leq 0.15$, $0.1 \leq x \leq 0.6$, $0 \leq y \leq 0.5$, $x+y+z=1$. A more preferable example is a nickel-containing lithium-transition metal composite oxide expressed by $Li_{1+a}(Ni_xCo_yMn_zM_b)_{1-a}O_2$ where M is at least one selected from the group consisting of Al, Ti, Zr, Nb, B, Mg, and Mo; and $0 \leq a \leq 0.15$, $0 \leq b \leq 0.02$, $0.1 \leq x \leq 0.6$, $0 \leq y \leq 0.5$, $0.2 \leq z \leq 0.4$; $x+y+z=1$. When a different metal M is added, it is preferable that Mn as a transition element be contained in the above-mentioned range in order to stabilize the crystal structure, and that the amount "b" of M be set to 0.0005 or more.

The non-aqueous electrolyte secondary cell of the present invention is preferably configured to have a high capacity, namely, a capacity of not less than 4 Ah and a weight energy density of not less than 50 Wh/kg, and is more preferably, a capacity of not less than 20 Ah and a weight energy density of not less than 100 Wh/kg.

To solve the above-mentioned problem, a method of the present invention for manufacturing a non-aqueous electrolyte secondary cell includes the steps of mixing graphite particles, amorphous carbon particles, and a binder; sintering the mixture obtained in the step of mixture at 900 to 1500° C. in a reducing atmosphere, thereby forming, on the surfaces of the graphite particles, a coating layer containing the amorphous carbon particles and an amorphous carbon layer, the amorphous carbon layer being a carbonized product of the binder; and preparing a negative electrode containing a negative electrode active material, the negative electrode active material at least containing the coated graphite particles prepared in the step of sintering and scaly graphite particles.

As a result of the above-described step of mixture and the step of sintering, the graphite particles are coated with the good-quality coating layer containing the amorphous carbon particles and the amorphous carbon layer made of the carbonized product of the binder. The resulting coated graphite particles and the scaly graphite particles are mixed to prepare the negative electrode active material. The negative electrode containing this negative electrode active material is used for manufacturing the non-aqueous electrolyte secondary cell of the present invention.

In the above-described method, the amorphous carbon particles may be carbon black; the binder may be a pitch; and in the step of mixture, the graphite particles, the carbon black, and the pitch may be mixed in a mass ratio of $100:\alpha:\beta$ where $1 \leq \alpha \leq \beta \leq 10$.

The carbon black, which is highly conductive and has a small volume change in charge-discharge cycles, is suitable for the amorphous carbon particles. The binder is preferably at least one selected from pitch, phenol resin, and furan resin because of their high bonding properties to firmly fix the amorphous carbon particles and the graphite particles. In terms of production, pitch is most preferable.

To make the coating layer good qualified, the graphite particles, the carbon black, and the pitch are mixed in a mass ratio of $100:\alpha:\beta$ where $1 \leq \alpha \leq \beta \leq 10$.

It is preferable that the carbon black (the amorphous carbon particles) have a median diameter of 30 to 100 nm when measured by laser diffraction, an oil absorption of 0.8 to 1.2 ml/g, and a specific surface area of 30 to 50 m²/g.

It is preferable that the sintering time be 24 hours or more.

Advantageous Effects of Invention

As described above, the present invention is directed to provide a non-aqueous electrolyte secondary cell that contains a graphite negative electrode, thereby having excellent high-rate charge-discharge capacity characteristics.

DESCRIPTION OF EMBODIMENT

The following are specific examples of the embodiment of the present invention. Note that the present invention is not limited to this embodiment and can be implemented in various forms within its scope.

Example 1

Preparation of the Positive Electrode

Lithium carbonate ($Li_2CO_3$) as a lithium source and ($Ni_{0.35}Co_{0.35}Mn_{0.3}$)$_3O_4$ as a transition metal source were mixed in such a manner that lithium and all the transition metals (Ni, Co, and Mn) were in a molar ratio of 1:1. The resultant mixture was sintered for 20 hours at 900° C. in air atmosphere so as to provide a lithium-transition metal composite oxide expressed by $LiNi_{0.35}Co_{0.35}Mn_{0.3}O_2$. This resultant compound was analyzed for crystal structure by X-rays and was found to have a layered structure.

The above-obtained lithium-transition metal composite oxide as a positive electrode active material was kneaded with carbon black used as a conductive agent and an N-methylpyrrolidone (NMP) solution of polyvinylidene fluoride (PVdF) used as a binder into a positive electrode active material slurry. In this case, the lithium-transition metal composite oxide, the carbon black, and the polyvinylidene fluoride were mixed in a mass ratio (solid content ratio) of 88:8:4. The positive electrode slurry was applied to both sides of an aluminum alloy foil (with a thickness of 15 μm) used as a positive electrode core body and dried to remove the NMP used as the solvent in the preparation of the slurry. As a result, a positive electrode active material layer was formed on the positive electrode core body. Then, the positive electrode core body with the positive electrode active material layer formed thereon was rolled to a predetermined packing density (2.4 g/cc) by a rolling mill and was cut in size to form positive electrodes. Note that the positive electrode core body has a core-body-exposed portion where the core body is exposed with no active material layer thereon.

Preparation of the Coated Graphite Particles
The Step of Mixture

Spherical graphite particles obtained by reforming natural graphite were mixed with a pitch and carbon black so that the surfaces of the natural graphite particles were coated with the pitch and the carbon black. In this case, the natural graphite, the pitch, and the carbon black were mixed in a mass ratio of 100:6.7:5.

The graphite particles had a median diameter (D50) of 14 μm, and the carbon black had a median diameter (D50) of 50 nm when measured with a laser diffraction particle size analyzer (Seishin Enterprise Co., Ltd., LMS-30).

The Step of Sintering

The mixture was sintered for 24 hours at 1500° C. in an inert gas atmosphere, and the sintered product was crushed and grounded into coated graphite particles.

The pitch was carbonized and lost its mass by 25% due to the sintering process, whereas the graphite particles and the carbon black kept their masses. As a result, after the sintering process, the natural graphite, the carbonized product of the pitch, and the carbon black were in a mass ratio of 100:5:5.

The coated graphite particles were observed with an electron microscope to find that the particles derived from the carbon black were bound to the graphite particles via the carbonized product of the pitch. The graphite particles as the nuclei and the coated graphite particles were subjected to argon laser Raman spectroscopy with a wavelength of 5145 angstroms to find that the ratio of the peak intensity ($I_{1360}$) at and near 1360 cm$^{-1}$ to the peak intensity ($I_{1580}$) at and near 1580 cm$^{-1}$ [$I_{1360}/I_{1580}$] was 0.10 or less in the graphite particles as the nuclei, and was 0.13 or more in the coated graphite particles.

The peak at and near 1580 cm$^{-1}$ is unique to graphite carbon, whereas the peak at and near 1360 cm$^{-1}$ may be observed in amorphous carbon, but is rarely observed in graphite carbon. The ratio [$I_{1360}/I_{1580}$] of the peak intensities changed from 0.10 or less to 0.13 or more through the coating process. This indicates that the coating layer containing the carbon black and the carbonized product of the pitch is made of amorphous carbon.

The coated graphite particles had a median diameter (D50) of 14 μm when measured with the laser diffraction particle size analyzer (Seishin Enterprise Co., Ltd., LMS-30) and a specific surface area of 5 m$^2$/g when measured by nitrogen absorption. Furthermore, the coated graphite particles had a tapped bulk density of 1.0 g/cc or more when calculated from the apparent volume by introducing 50 g of the coated graphite particles into a graduated cylinder and then being tapped 700 times.

The Step of Preparing a Negative Electrode

The coated graphite particles were kneaded with scaly graphite, carboxymethylcellulose (CMC) as a viscosity improver, styrene-butadiene rubber (SBR) as a binder, and water into a negative electrode active material slurry. In this case, the coated graphite particles, the scaly graphite, the carboxymethylcellulose, and the styrene-butadiene rubber were mixed in a mass ratio of 96.7:2.0:0.7:0.6. The negative electrode slurry was applied to both sides of a copper foil (with a thickness of 10 μm) used as a negative electrode core body and dried to remove the water used as the solvent in the preparation of the slurry. As a result, a negative electrode active material layer was formed on the negative electrode core body. Then, the negative electrode core body with the negative electrode active material layer formed thereon was rolled to a predetermined packing density (1.4 g/cc) by a rolling mill and was cut in size to form negative electrodes. Note that the negative electrode core body has a core-body-exposed portion where the core body is exposed with no active material layer thereon.

The scaly graphite particles had a median diameter (D50) of 7 μm when measured with a laser diffraction apparatus (Micro Track Co., Ltd. 9220-FRA) and a specific surface area of 9 m$^2$/g when measured by nitrogen absorption. Furthermore, the scaly graphite particles had a tapped bulk density of 0.07 g/cc or more when calculated from the apparent volume by introducing 50 g of the coated graphite particles into a graduated cylinder and then being tapped 700 times.

The above-mentioned packing density was measured as follows separately for the positive and negative electrodes. First, an electrode plate was cut in 10 cm$^2$, and the electrode of area 10 cm$^2$ was measured for mass A (g) and thickness C (cm). Next, a core body of area 10 cm$^2$ was measured for mass B (g) and thickness D (cm). Then, the packing density was calculated by the following formula.

$$\text{packing density} = (A-B)/[(C-D) \times 10 \text{ cm}^2]$$

Preparation of Non-Aqueous Electrolyte

Lithium hexafluorophosphate ($LiPF_6$) as a solute was dissolved at 1 mol/L in a mixture solvent of ethylene carbonate (EC) and ethyl methyl carbonate (EMC) in a volume ratio of 3:7 (at 25° C. and 1 atm). Next, 0.3 parts by mass of vinylene carbonate (VC) was added to 99.7 parts by mass of the resultant solution, thereby preparing a non-aqueous electrolyte.

Assembly of the Non-Aqueous Electrolyte Secondary Cell

The positive and negative electrodes were stacked with a separator interposed therebetween and were wound to form a wound electrode assembly. In this electrode assembly, the separator is composed of a polyethylene microporous film, and the core-body-exposed portions of the positive and negative electrodes are projected from the separator. Next, positive and negative current collecting plates were laser-welded to both ends of the wound electrode assembly (to the core-body-exposed portions projected from both ends of the separator). Next, the wound electrode assembly was put into a metal outer can, and leads protruding from the ends of the current collecting plates were connected to an electrode terminal mechanism. Next, a non-aqueous electrolyte was poured, and the opening of the outer can was sealed with a sealing body, thereby completing non-aqueous electrolyte secondary cells of Example 1.

Example 2

Non-aqueous electrolyte secondary cells of Example 2 were prepared in the same manner as in Example 1 except that in the step of preparing the negative electrode, the coated graphite particles, the scaly graphite, the carboxymethylcellulose, and the styrene-butadiene rubber were mixed in a mass ratio of 97.7:1.0:0.7:0.6.

Comparative Example 1

Non-aqueous electrolyte secondary cells of Comparative Example 1 were prepared in the same manner as in Example 1 except that in the step of preparing the negative electrode, the coated graphite particles, the carboxymethylcellulose, and the styrene-butadiene rubber were mixed in a mass ratio of 98.7:0.7:0.6.

Measurement of Discharge Capacity

The cells of Examples 1, 2 and Comparative Example 1 were examined for discharge capacity as follows. The cells were charged at a constant current of 1 It (25 A) until the voltage reached 4.1 V, and then at a constant voltage of 4.1 V, a total of two hours. Next, the cells were discharged at a constant current of ⅓ It (8.333 A) until the voltage reached 3.0 V, and then at a constant voltage of 3.0 V, a total of five hours. The results are shown in Table 1 below.

Cycle Test at 60° C.

The cells of Examples 1, 2 and Comparative Example 1 were subjected to 200 charge-discharge cycles at a high temperature (60° C.) under the conditions shown below. The capacity retention rate was calculated by the formula shown below. Furthermore, the cells after the 200 cycles were examined for room- and low-temperature I-V characteristics by the method described below. The results are shown in Table 1 as relative values when the value in Comparative Example 1 is 100.

Charge: at a constant current of 2 It (50 A) until the voltage reached 4.1 V, and then at a constant voltage of 4.1 V, a total of two hours Discharge: at a constant current of 2 It (50 A) until the voltage reached 3.0 V Measurement of Room-Temperature I-V Characteristics After the 60° C. cycle test, the cells were charged at a constant current of 1 It (25 A) until the state of charge (SOC) reached 50%. Next, these cells were discharged for ten seconds at constant currents of 1.6 It, 3.2 It, 4.8 It, 6.4 It, 8.0 It, and 9.6 It. The cell voltages were measured, and each current and cell voltage were plotted to find an output (power W) at a discharge of 3 V. This measurement was performed at 25° C.

Measurement of Low-Temperature I-V Characteristics

After the 60° C. cycle test, the cells were charged at 25° C. at a constant current of 1 It (25 A) until the state of charge (SOC) reached 50%. Next, these cells were subjected to charge-discharge cycles for ten seconds at −30° C. at constant currents of 1.6 It, 3.2 It, 4.8 It, 6.4 It, 8.0 It, and 9.6 It. The cell voltages were measured, and each current and cell voltage were plotted to find an output power corresponding to the electric power (W) at a discharge of 3 V, and a regenerative power corresponding to the electric power (W) at a charge of 4.3 V.

Capacity retention rate (%)=200th cycle discharge capacity÷1st cycle discharge capacity×100

TABLE 1

| | scaly graphite content (% by mass) | capacity retention rate after repeated cycles (%) | normal-temperature output after repeated cycles (%) | low-temperature output after repeated cycles (%) | low-temperature regeneration after repeated cycles (%) |
|---|---|---|---|---|---|
| Example 1 | 2 | 102 | 102 | 107 | 118 |
| Example 2 | 1 | 99 | 100 | 102 | 114 |
| Comparative Example 1 | 0 | 100 | 100 | 100 | 100 |

As shown in Table 1, the cells of Examples 1 and 2, which include the negative electrode containing the scaly graphite exhibit low-temperature outputs after repeated cycles of 107% and 102%, respectively, and low-temperature regenerations after repeated cycles of 118% and 114%, respectively. These values are superior to those of the cells of Comparative Example 1 which include the negative electrode not containing scaly graphite.

The reason for these results is considered as follows. The scaly graphite particles have less volume change after the charge-discharge cycles than the coated graphite particles. Therefore, when the negative electrode contains the scaly graphite particles in addition to the coated graphite particles, the scaly graphite particles function as an absorber to absorb the volume change of the coated graphite particles. The scaly graphite particles also function to connect between the coated graphite particles highly conductively, and hence to homogenize the charge-discharge reactions in the negative electrode because the scaly graphite particles have higher electron conductivity and a larger specific surface area than the coated graphite particles. These functions especially improve low-temperature outputs and low-temperature regenerations after repeated cycles.

Although having a smaller capacity than graphite, amorphous carbon has a high performance to accept lithium ions and a high wettability to an electrolytic solution. As a result, the use of the coated graphite particles, which contain graphite particles and a coating layer coating the surfaces of the graphite particles and containing the amorphous carbon particles and the amorphous carbon layer, reduces lithium deposition due to rapid charge and improves cycle characteristics.

Example 3

Non-aqueous electrolyte secondary cells of Example 3 were prepared in the same manner as in Example 1 except for the following. In the preparation of the positive electrode, the lithium-transition metal composite oxide, the carbon black, the polyvinylidene fluoride (PVdF) were mixed in a mass ratio of 91:6:3. In the preparation of the non-aqueous electrolyte, lithium hexafluorophosphate (LiPF$_6$) was used at 1.2 mol/L. In the step of preparing the negative electrode, the coated graphite particles, the scaly graphite, the carboxymethylcellulose, and the styrene-butadiene rubber were mixed in a mass ratio of 92.7:6.0:0.7:0.6, and that the rolling was continued until the packing density reached 1.5 g/cc.

Example 4

Non-aqueous electrolyte secondary cells of Example 4 were prepared in the same manner as in Example 3 except that in the step of preparing the negative electrode, the coated graphite particles, the scaly graphite, the carboxymethylcellulose, and the styrene-butadiene rubber were mixed in a mass ratio of 94.7:4.0:0.7:0.6.

Example 5

Non-aqueous electrolyte secondary cells of Example 5 were prepared in the same manner as in Example 3 except that in the step of preparing the negative electrode, the coated graphite particles, the scaly graphite, the carboxymethylcellulose, and the styrene-butadiene rubber were mixed in a mass ratio of 96.7:2.0:0.7:0.6.

The cells of Examples 3 to 5 were subjected to the 60° C. cycle test and the measurement of room- and low-temperature I-V characteristics in the same manner as above. The results are shown in Table 2 as relative values when the value in Example 5 is 100.

The reason for these results is considered as follows. As the content of the scaly graphite particles is decreased, the above-mentioned effect of the scaly graphite particles is decreased. On the other hand, as the content of the scaly graphite particles is increased, the above-mentioned effect of the coated graphite particles is decreased. In the above series, the cells of Example 4, which include the negative electrode containing 4% by mass of the scaly graphite particles are best-balanced, exhibiting high performance in all of the normal-temperature output, the low-temperature output, and the low-temperature regeneration. From these results, it is preferable that the proportion of the scaly graphite particles in the negative electrode active material be 1 to 6% by mass.

Comparative Example 2

Non-aqueous electrolyte secondary cells of Comparative Example 2 were prepared in the same manner as in Example 1 except for the following. In the preparation of the positive electrode, the lithium-transition metal composite oxide, the carbon black, the polyvinylidene fluoride (PVdF) were mixed in a mass ratio of 91:6:3, and the rolling was continued until the packing density reached 2.5 g/cc. In the step of mixture, carbon black was not used, and the natural graphite and the pitch were mixed in a mass ratio of 100:5. In the step of preparing the negative electrode, the coated graphite particles, the carboxymethylcellulose, and the styrene-butadiene rubber were mixed in a mass ratio of 98.7:0.7:0.6, and that the rolling was continued until the packing density reached 1.5 g/cc using a rolling mill.

Comparative Example 3

Non-aqueous electrolyte secondary cells of Comparative Example 3 were prepared in the same manner as in Comparative Example 2 except that in the step of preparing the negative electrode, the coated graphite particles, the scaly graphite, the carboxymethylcellulose, and the styrene-butadiene rubber were mixed in a mass ratio of 96.7:2.0:0.7:0.6.

Comparative Example 4

Non-aqueous electrolyte secondary cells of Comparative Example 4 were prepared in the same manner as in Comparative Example 2 except that in the step of preparing the

TABLE 2

| | scaly graphite content (% by mass) | capacity retention rate after repeated cycles (%) | normal-temperature output after repeated cycles (%) | low-temperature output after repeated cycles (%) | low-temperature regeneration after repeated cycles (%) |
|---|---|---|---|---|---|
| Example 3 | 6 | 100 | 99 | 103 | 107 |
| Example 4 | 4 | 101 | 101 | 109 | 110 |
| Example 5 | 2 | 100 | 100 | 100 | 100 |

As shown in Table 2, the cells of Examples 3 to 5, which include the negative electrode containing 2 to 6% by mass of the scaly graphite particles exhibit similar results in the normal-temperature output, namely 99 to 101%, the low-temperature output, namely 100 to 109%, and the low-temperature regeneration, namely 100 to 110% after repeated cycles. Thus, the cells of Example 4, which include the negative electrode containing 4% by mass of the scaly graphite particles are superior in all of the normal-temperature output, the low-temperature output, and the low-temperature regeneration.

negative electrode, the coated graphite particles, the scaly graphite, the carboxymethylcellulose, and the styrene-butadiene rubber were mixed in a mass ratio of 94.7:4.0:0.7:0.6.

Comparative Example 5

Non-aqueous electrolyte secondary cells of Comparative Example 5 were prepared in the same manner as in Example 1 except that in the step of preparing the negative electrode, the coated graphite particles, the carboxymethylcellulose, and the styrene-butadiene rubber were mixed in a mass ratio of 98.7:0.7:0.6 and that the rolling was continued until the packing density reached 1.5 g/cc.

Example 6

Non-aqueous electrolyte secondary cells of Example 6 were prepared in the same manner as in Example 1 except that in the step of preparing the negative electrode, the coated graphite particles, the scaly graphite, the carboxymethylcellulose, and the styrene-butadiene rubber were mixed in a mass ratio of 94.7:4.0:0.7:0.6 ant that in the step of preparing the negative electrode, the rolling was continued until the packing density reached 1.5 g/cc.

The cells of Comparative Examples 2 to 5 and Example 6 were subjected to the 60° C. cycle test and the measurement of room- and low-temperature I-V characteristics in the same manner as above. The results are shown in Table 3 as relative values when the value in Example 6 is 100.

TABLE 3

| | the presence or absence of CB particles of the coating layer | scaly graphite content (% by mass) | capacity retention rate after repeated cycles (%) | normal-temperature output after repeated cycles (%) |
|---|---|---|---|---|
| Comparative Example 2 | absent | 0 | 94 | 103 |
| Comparative Example 3 | absent | 2 | 97 | 99 |
| Comparative Example 4 | absent | 4 | 99 | 96 |
| Comparative Example 5 | present | 0 | 96 | 98 |
| Example 6 | present | 4 | 100 | 100 |

As shown in Table 3, the cells of Example 6 include the negative electrode containing the scaly graphite particles, and also include the coating layer containing the carbon black (CB), which is the amorphous carbon particles. These cells of Example 6 are superior in the capacity retention rate and the normal-temperature output after repeated cycles to those of Comparative Examples 3 to 5 lacking either the scaly graphite particles or the carbon black, and are also superior in the capacity retention rate after repeated cycles to those of Comparative Example 2 containing neither of them.

The reason for these results is considered as follows. The carbon black (the amorphous carbon particles) is more conductive than the amorphous carbon layer, thereby improving the electron conductivity of the negative electrode. Furthermore, as described above, the scaly graphite particles have less volume change after charge-discharge cycles than the coated graphite particles. Therefore, when the negative electrode contains the scaly graphite particles in addition to the coated graphite particles, the scaly graphite particles function as an absorber to absorb the volume change of the coated graphite particles. The scaly graphite particles also function to homogenize the charge-discharge reactions in the negative electrode because the scaly graphite particles have higher electron conductivity than the coated graphite particles. These effects act synergistically to allow homogeneous charge-discharge reactions in the negative electrode after the cycle test, thereby achieving the high capacity retention rate and the high normal-temperature output after repeated cycles.

The above-described synergistic effects can be obtained only when the negative electrode active material contains both the scaly graphite particles and the coated graphite particles whose surfaces are coated with the coating layer containing the amorphous carbon particles and the amorphous carbon layer. In other words, the synergistic effects cannot be obtained if the negative electrode active material contains only one or neither of them (Comparative Examples 2 to 5).

INDUSTRIAL APPLICABILITY

As described hereinbefore, the non-aqueous electrolyte secondary cell of the present invention has high cycle characteristics and high I-V characteristics after repeated cycles, providing high industrial applicability.

The invention claimed is:

1. A non-aqueous electrolyte secondary cell comprising:
a positive electrode containing a positive electrode active material;
a negative electrode containing a negative electrode active material; and
a non-aqueous electrolyte,
wherein
the negative electrode active material contains:
scaly graphite particles; and
coated graphite particles containing graphite particles and a coating layer coating surfaces of the graphite particles, the coating layer containing amorphous carbon particles and an amorphous carbon layer,
the coated graphite particles have a specific surface area of 4 to 6 $m^2/g$,
the coated graphite particles have a tapped bulk density of not less than 0.9 g/cc,
the scaly graphite particles have a specific surface area of 5 to 15 $m^2/g$,
the scaly graphite particles have a tapped bulk density of not less than 0.05 g/cc,
the negative electrode includes a negative electrode active material layer containing the negative electrode active material and a negative electrode binder for binding the negative electrode active material,
the negative electrode active material layer contains 1 to 6% by mass of the scaly graphite particles,
the negative electrode active material layer contains 92.7 to 97.7% by mass of the coated graphite particles, and
the negative electrode binder contains styrene-butadiene rubber.

2. The non-aqueous electrolyte secondary cell of claim 1, wherein the coated graphite particles contain the graphite particles, the amorphous carbon particles, and the amorphous carbon layer in a mass ratio of 100:α:β where $1 \leq \alpha \leq 10$, $1 \leq \beta \leq 10$, and $\alpha \leq 1.34\beta$.

3. The non-aqueous electrolyte secondary cell of claim 1, wherein the coated graphite particles have a median diameter of 12 to 16 μm when measured by laser diffraction.

4. The non-aqueous electrolyte secondary cell of claim 1, wherein the scaly graphite particles have a median diameter of 5 to 10 μm when measured by laser diffraction.

5. The non-aqueous electrolyte secondary cell of claim 1, wherein the positive electrode active material is a lithium-transition metal composite oxide having a layered structure expressed by $Li_{1+a}(Ni_xCo_yMn_z)_{1-a}O_2$ where $0 \leq a \leq 0.15$, $0.1 \leq x \leq 0.6$, $0 \leq y \leq 0.5$, $x+y+z=1$.

6. The non-aqueous electrolyte secondary cell of claim 1, wherein the positive electrode active material is a lithium-transition metal composite oxide having a layered structure expressed by $Li_{1+a}(Ni_xCo_yMn_zM_b)_{1-a}O_2$ where M is at least one selected from the group consisting of Al, Ti, Zr, Nb, B, Mg, and Mo; and $0 \leq a \leq 0.15$, $0 \leq b \leq 0.02$, $0.1 \leq x \leq 0.6$, $0 \leq y \leq 0.5$, $0.2 \leq z \leq 0.4$; $x+y+z=1$.

7. The non-aqueous electrolyte secondary cell of claim 1 has a capacity of not less than 4 Ah and an energy density of not less than 50 Wh/kg.

8. The non-aqueous electrolyte secondary cell of claim 1 has a capacity of not less than 20 Ah and an energy density of not less than 100 Wh/kg.

9. A method of manufacturing a non-aqueous electrolyte secondary cell, comprising the steps of:
    mixing graphite particles, amorphous carbon particles, and a binder;
    sintering a mixture obtained in the step of mixing the graphite particles, the amorphous carbon particles, and the binder at 900 to 1500° C. in a reducing atmosphere, thereby forming, on surfaces of the graphite particles, a coating layer containing the amorphous carbon particles and an amorphous carbon layer, the amorphous carbon layer being a carbonized product of the binder; and
    preparing a negative electrode containing a negative electrode active material, the negative electrode active material at least containing the coated graphite particles prepared in the step of sintering and scaly graphite particles, wherein,
    the coated graphite particles have a specific surface area of 4 to 6 $m^2/g$,
    the coated graphite particles have a tapped bulk density of not less than 0.9 g/cc,
    the scaly graphite particles have a specific surface area of 5 to 15 $m^2/g$,
    the scaly graphite particles have a tapped bulk density of not less than 0.05 g/cc,
    the negative electrode includes a negative electrode active material layer containing the negative electrode active material and a negative electrode binder for binding the negative electrode active material,
    the negative electrode active material layer contains 1 to 6% by mass of the scaly graphite particles,
    the negative electrode active material layer contains 92.7 to 97.7% by mass of the coated graphite particles, and
    the negative electrode binder contains styrene-butadiene rubber.

10. The method of claim 9, wherein
    the amorphous carbon particles are carbon black;
    the binder is a pitch; and
    in the step of mixture, the graphite particles, the carbon black, and the pitch are mixed in a mass ratio of $100:\alpha:\beta$ where $1 \leq \alpha \leq \beta \leq 10$.

* * * * *